June 29, 1965 F. KRAHULEC 3,191,941

SPINDLE ADAPTER

Filed June 11, 1962

INVENTOR.

Fred Krahulec

BY Hofgren, Brady, Wegner, Allen & Stellman

Attys 3,191,941

SPINDLE ADAPTER

Fred Krahulec, Skokie, Ill., assignor to Warwick Electronics Inc., a Delaware corporation Filed June 11, 1962, Ser. No. 203,686
6 Claims. (Cl. 274—10)

This invention relates to a phonograph spindle adapter for centering and holding a stack of large hole records and more particularly to such an adapter constructed to permit operation of the record ejector mechanism of the small hole record spindle to directly engage and eject a large hole record from the stack.

An object of this invention is to provide a new and improved spindle adapter for association with a phonograph small hole record spindle in which the adapter has no record ejector mechanism but utilizes the record ejector mechanism of the small hole record spindle to directly engage and eject a record.

Another object of the invention is to provide a spindle adapter for use with a spindle which supports and centers small hole records and has a record ejector member, said adapter supporting and centering a large hole record stack for dropping of a lowermost record in the stack onto a turntable upon operation of said record ejector, said adapter having a body with a lower part terminating at its upper end in a shoulder to support a large hole record stack, a passage in said body for receiving the small hole record spindle, said passage being exposed immediately above said shoulder to permit said record ejector to move outwardly over the shoulder and in the process shift a large hole record off the shoulder, and means on the body above the shoulder for guiding the lowermost record of a large hole record stack onto said shoulder after the ejection of a record.

Further objects and advantages will become apparent from the following detailed description taken in connection with the accompanying drawings in which.

Figures 1, 2, 3:
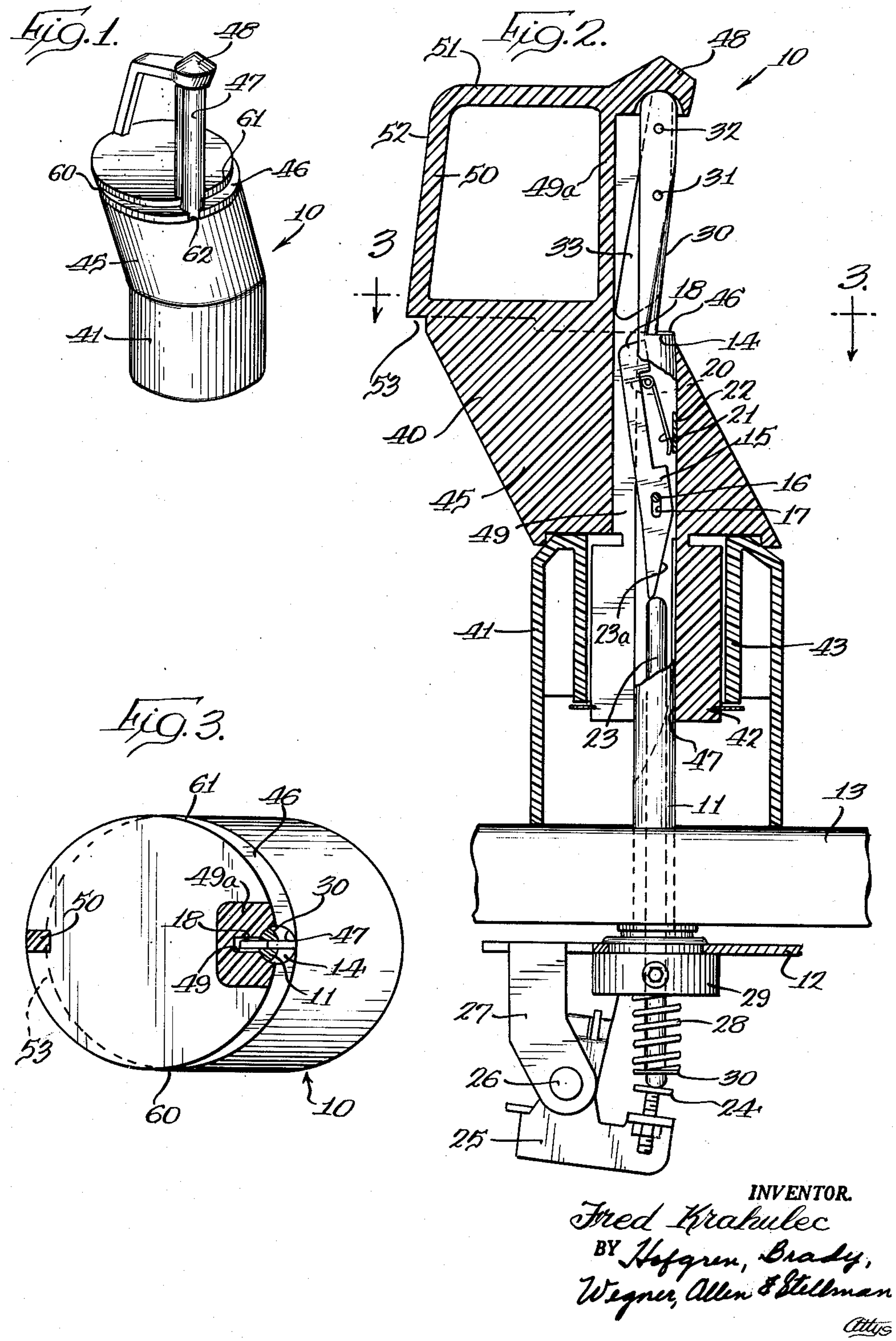
FIG. 1 is a perspective view of the spindle adapter for large hole records.
FIG. 2 is an enlarged vertical center line section through the spindle adapter shown in FIG. 1 and with the adapter shown in position on a phonograph small hole record spindle with parts of the spindle broken away.
FIG. 3 is a horizontal section taken generally along the line 3—3 in FIG. 2.

While this invention is susceptible of embodiment in many different forms, there is shown in the drawings and will herein be described in detail an embodiment of the invention with the understanding that the present disclosure is to be considered as an exemplification of the principles of the invention and is not intended to limit the invention to the embodiment illustrated. The scope of the invention will be pointed out in the appended claims.

As shown in the drawings, the spindle adapter indicated generally at 10, is mountable on the normal small hole record spindle 11 of a phonograph. The phonograph has a motor board 12 which rotatably mounts a turntable 13 and the spindle 11 is affixed to the motor board. The spindle 11 comprises an upstanding generally hollow stem provided with a shoulder 14 and mounting an ejector lever 15 by means of a pin 16 carried on the stem and engageable in an elongated slot 17 in the lever 15. The ejector lever 15 has an upper ejecting end 18 which normally lies beneath the shoulder 14 and is urged in a counterclockwise direction to the position shown in FIG. 2 by a spring having an end 20 fixed in the lever 15 and an opposite end 21 slidable on a plate 22 carried within the spindle stem.

In operation of the ejector lever 15, it first rises to place the ejector end 18 at a level above the shoulder 14 and then pivots in a clockwise direction to move the ejector end 18 beyond the shoulder, toward the right as viewed in FIG. 2, this movement ejects a record from the shoulder and the lever then lowers under the weight of a record stack and returns to the position shown in FIG. 2. These movements are effected by a shiftable pin 23 movably mounted within the stem. The pin 23 at its upper end engages the lower end of the ejector lever 15 and subsequently engages a sloped surface 23*a* thereof. This pin extends down beneath the motor board 12 for engagement by a member 24 carried on a lever 25 pivoted at 26 on a bracket 27 supported from the motor board. A spring 28 extends between a bushing 29 and a collar 30 to normally urge the pin 23 downwardly to the position shown in FIG. 2. Thus pivoting of the lever 25 in a counterclockwise direction results in raising the pin 23 and subsequently permits lowering of the pin when the lever 25 returns to its initial position. During the movements of the lever 25 the ejector lever 15 is caused to go through the movements described above.

The spindle 11 above the shoulder 14 has an inclined surface 30 tapering downwardly and inwardly to form the shoulder 14 and pair of pins 31 and 32 movably mount a slotted blade 33 which extends outwardly of the spindle from the side opposite the surface 30 and acts to guide small hole records downwardly onto the shoulder 14.

It will thus be seen that the above described spindle structure 11 and the operating means associated therewith function to support and center a stack of small hole records as well as successively ejecting the lowermost record of the stack upon each operation of the ejector lever 15.

In order to utilize the same spindle 11 for handling large hole records, the spindle adapter 10 is provided which may easily be placed over the spindle 11 and which utilizes the same ejector lever 15 without requiring any additional moving parts for ejecting a large hole record.

The spindle adapter 10 comprises a body with an upper body part 40 and a lower body part 41 with the upper body part 40 having a sleeve 42 onto which a tubular part 43 of the lower body part 41 is loosely fitted. The lower body part 41 is a cylindrical member and guides a record or records placed upon the turntable 13 during playing thereof.

The upper body part 40 is of a one-piece construction and has generally its lower half 45 formed as an inclined generally elliptical component to receive a record hole moving downward at an angle. This half 45 terminates at its upper end in a shoulder 46 which extends about substantially half the perimeter of the upper body part 40 and which is at a level above and has its widest portion immediately adjacent the shoulder 14 of the record spindle 11.

The upper body part 40 of the spindle adapter has a passage 47 extending longitudinally thereof for its entire length to enable placement of the adapter 10 onto the spindle 11 and this passage terminates at its upper end in a cap 48 which engages the top of the small hole record spindle 11 to locate the adapter 10 in proper elevation on the spindle 11. The passage 47 also has a generally rectangular slot 49 extending the length thereof which provides space for the ejector lever 15 and the blade 33 as shown in FIG. 2 with the blade 33 engaged in this slot to lock the adapter 10 against rotation relative to the spindle 11.

The cap 48 is supported by a columnar section 49*a* of the body part 40 and an inclined rib 50 is connected to the part 48 through cross-piece 51. The inclined rib 50 has means in the form of an external surface 52 which slopes correspondingly to the inclined surface 30 of the spindle 11 whereby a stack of large hole records is caused to be successively guided onto the adapter shoulder 46. The rib 50 is undercut as shown at 53, a distance sufficient to permit shift of the lowermost record in a stack toward the right as viewed in FIG. 2 to have the record hole clear the shoulder 46. The undercut 53 has a height at least equal to the thickness of a record to permit free movement of a record. The undercut is still limited in height to hold against shift the next record above the record being shifted so that the held record will subsequently move down upon the shoulder 46.

To facilitate centering of the record stack a pair of vertical walls 60 and 61 are blended into the lower end of the rib 50. The wall 61 is coincident with the hole in a record at the bottom of a stack, while wall 60 corresponds to the location of a record hole after the record is shifted for dropping to the turntable. The wall 61 blends into the wall 60 to permit record shift.

The passage 47 in the spindle adapter 10 is exposed above the adapter shoulder 46 and is also exposed immediately beneath the shoulder as indicated at 62 in FIG. 1, whereby the ejector lever 15 is free to move in its normal path which has the ejector end 18 extending beyond the surface of the adapter or to the right of the surface as shown in FIG. 2.

In order to steady the stack of large hole records on the adapter 10 an arm (not shown) rests upon the top of the stack. This arm is commonly found in phonographs for resting upon a stack of small hole records supported on the spindle 11 having a spindle ejector mechanism such as the ejector lever 15.

I claim:

1. A spindle adapter for use with a rotatable phonograph turntable and a spindle of relatively small diameter for records having center holes of correspondingly small diameter, said spindle having a shiftable lever for laterally shifting a record relative to said spindle, in combination, an adapter body for supporting and centering a stack of records with large diameter center holes, said body having a passage extending for the length thereof for placement on said spindle and a cap at the top of said body engageable with the upper end of the spindle to position said body on the spindle, a shoulder on said body for supporting a stack of records, said passage being exposed immediately above and below said shoulder, means on said body at the side opposite said shoulder sloped to lead the record stack down onto said shoulder and terminating at a level a record thickness above the shoulder whereby actuation of the shiftable lever projects the lever through the exposed opening and shifts a record off the shoulder and beneath the sloped means, said sloped means being fixed against movement in a plane generally parallel with said shoulder to hold a succeeding record against movement while a record is shifted off said shoulder, and a part of said body beneath the shoulder guiding a record onto the turntable while the sloped means guides the succeeding record at the bottom of the record stack onto said shoulder.

2. A spindle adapter as defined in claim 1 in which said passage is open for substantially its entire length above the shoulder and said sloped means on the body coacts with a correspondingly inclined surface on the spindle exposed through said open passage to guide a large hole record stack onto said shoulder.

3. A spindle adapter for use with a rotatable phonograph turntable and a spindle for records having center holes of small diameter, said spindle having a shiftable lever for laterally shifting a record relative to said spindle, in combination, an adapter body for supporting and centering a stack of records with large diameter center holes, said body having an axially directed passage for the length thereof for placement on said spindle, a shoulder on said body for supporting a stack of records, said passage being exposed immediately above said shoulder, and means for guiding the record stack down onto said shoulder whereby actuation of the shiftable lever projects the lever through the exposed opening and shifts a record off the shoulder, said means being immovable in the direction of movement of said shiftable lever and terminating at a level above the shoulder a distance at least equal to the thickness of a record to hold all but the lowermost record of the record stack against movement upon actuation of the shiftable lever.

4. A spindle adapter for large hole records and having no moving parts for support of a record stack and ejection of a lowermost record from the stack for use with a record ejecting spindle which supports and centers small hole records and has a record ejector member, said adapter supporting and centering a large hole record stack for dropping of a lowermost record in the stack onto a turntable by operation of said record ejector, said adapter having a body with an inclined part terminating at its upper end in a shoulder to provide the only support for a large hole record stack, a passage in said body for receiving the small hole record spindle, said passage being exposed immediately above said shoulder to permit said record ejector member to move outwardly beyond the shoulder and in the process shift a large hole record off the shoulder, and means defining a surface on the body above the shoulder for guiding the lowermost record of a large hole record stack onto said shoulder, said surface terminating a record thickness away from said shoulder and said means being immovable in the direction of movement of the record ejector member to hold all but the lowermost record in the stack against movement.

5. A spindle adapter, in combination with a record changer, a record ejecting spindle with a shelf for supporting and centering small hole records, a record ejector member mounted for movement on said spindle and movable in a record changing operation, said adapter centering a large hole record stack for dropping of a lowermost record in the stack onto a turntable by operation of said record ejector member, said adapter having a body with a passage in said body for receiving the small hole record spindle to place the adapter in operative position, said passage opening to the periphery of the adapter body at a support position for the record stack at the level of said record ejector member, means on the body immovable in a plane transverse to the length of said passage and terminating a record thickness above said support position for guiding the lowermost record of a large hole record stack to the support position for subsequent engagement by said record ejector member and for preventing lateral movement of records in the stack above the lowermost record as the lowermost record is moved beneath said means and ejected from the support position.

6. A spindle adapter, in combination with a record changer, a record ejecting spindle with a shelf for supporting and centering small hole records, a record ejector member mounted for movement on said spindle and movable in a record changing operation, said adapter centering a large hole record stack for dropping of a lowermost record in the stack onto a turntable by operation of said record ejector member, said adapter having a body with a passage in said body for receiving the small hole record spindle to place the adapter in operative position, said passage opening to the periphery of the adapter body at a support position for the record stack at the level of said record ejector member, means immovable in a plane transverse to the length of said passage for guiding the lowermost record of a large hole record stack to the support position for subsequent engagement by said record ejector member and for preventing lateral movement of records in the stack above the lowermost record as the lowermost record is ejected from the support position including a pair of diametrically opposed surfaces located above the support position and extending in generally parallel sloped relation and spaced apart a distance approximately equal to the hole diameter of a large hole record, one of said surfaces terminating a record thickness above the support position whereby a record can be shifted therebeneath as the record is ejected.

References Cited by the Examiner

UNITED STATES PATENTS

| | | | |
|---|---|---|---|
| 2,651,523 | 9/53 | Dale | 274—10 |
| 2,884,255 | 4/59 | Wennerbo | 274—10 |

LOUIS J. CAPOZI, *Primary Examiner.*

EMIL G. ANDERSON, *Examiner.*